United States Patent
Nakata et al.

(10) Patent No.: US 10,122,026 B2
(45) Date of Patent: Nov. 6, 2018

(54) FUEL CELL SYSTEM

(71) Applicant: Panasonic Corporation, Osaka (JP)

(72) Inventors: Hideki Nakata, Kyoto (JP); Kunihiro Ukai, Nara (JP)

(73) Assignee: PANASONIC CORPORATION, Osaka (JP)

( * ) Notice: Subject to any disclaimer, the term of this patent is extended or adjusted under 35 U.S.C. 154(b) by 446 days.

(21) Appl. No.: 14/563,034

(22) Filed: Dec. 8, 2014

(65) Prior Publication Data
US 2015/0180055 A1 Jun. 25, 2015

(30) Foreign Application Priority Data

Dec. 19, 2013 (JP) .................. 2013-262386

(51) Int. Cl.
H01M 8/04 (2016.01)
H01M 8/06 (2016.01)
H01M 8/04014 (2016.01)
H01M 8/0662 (2016.01)
H01M 8/04007 (2016.01)
H01M 8/0432 (2016.01)
H01M 8/04701 (2016.01)
(Continued)

(52) U.S. Cl.
CPC ... *H01M 8/04014* (2013.01); *H01M 8/04067* (2013.01); *H01M 8/04373* (2013.01); *H01M 8/04738* (2013.01); *H01M 8/04768* (2013.01); *H01M 8/0675* (2013.01); *H01M 2008/1293* (2013.01)

(58) Field of Classification Search
None
See application file for complete search history.

(56) References Cited

U.S. PATENT DOCUMENTS 5,769,909 A * 6/1998 Bonk ................. B01D 53/8603
422/608
2012/0034538 A1* 2/2012 Jahnke ............. H01M 8/04291
429/410

FOREIGN PATENT DOCUMENTS

| JP | 10-214632 | | 8/1998 |
| JP | 10-265201 | A | 10/1998 |
| JP | 2001-504141 | A | 3/2001 |

(Continued)

OTHER PUBLICATIONS

Extended European Search Report issued in Application No. 14195820.7 dated Apr. 21, 2015.

*Primary Examiner* — Jonathan Crepeau
(74) *Attorney, Agent, or Firm* — McDermott Will & Emery LLP

(57) ABSTRACT

A fuel cell system includes a hydrodesulfurizer configured to remove a sulfur compound in a raw material; a fuel cell configured to generate power by electrochemical reaction using a fuel gas and an oxidizing gas, the fuel gas being obtained by reforming the raw material desulfurized with the hydrodesulfurizer; a heater configured to heat the hydrodesulfurizer by utilizing the heat of an exhaust gas circulated in the fuel cell system including the fuel cell; an introduction passage disposed to guide the exhaust gas to the heater; and a gas supply unit configured to supply a cooling gas to the exhaust gas, the cooling gas being not utilized in the power generation in the fuel cell system, wherein a mixture gas of the exhaust gas and the cooling gas supplied from the gas supply unit is passed through the inside of the heater.

6 Claims, 8 Drawing Sheets

(51) Int. Cl.
  *H01M 8/04746* (2016.01)
  *H01M 8/124* (2016.01)

(56) References Cited

FOREIGN PATENT DOCUMENTS

| | | |
|---|---|---|
| JP | 2006-309982 | 11/2006 |
| JP | 2010-272333 A | 12/2010 |
| JP | 2011-181268 A | 9/2011 |
| JP | 2012-155978 | 8/2012 |
| JP | 2013-229129 A | 11/2013 |

\* cited by examiner

FUEL CELL SYSTEM

BACKGROUND

1. Technical Field:

The present disclosure relates to fuel cell systems including a hydrodesulfurizer for removing sulfur components present in raw materials.

2. Description of the Related Art:

Solid oxide fuel cells (SOFC), which are a type of fuel cells operating at high temperatures, have been developed progressively. In solid oxide fuel cell systems involving hydrocarbons as raw materials, the raw materials are reformed by, for example, steam reformation using steam. Steam reforming catalysts are used to promote this steam reformation. These steam reforming catalysts are vulnerable to degradation by odorants or sulfur compounds present in the raw materials. To prevent the steam reforming catalysts from being degraded, desulfurizers are used which decrease the amounts of odorants or sulfur compounds present in the raw materials.

The desulfurizers contain a desulfurizing catalyst, which exhibits varied performances depending on the ambient temperature. It is therefore necessary that the desulfurizer be heated in the case where the desulfurizing catalyst that is used exhibits higher performance in the removal of sulfur components at higher temperatures than at normal temperature. For example, Japanese Unexamined Patent Application Publication No. 2006-309982 proposes a solid oxide fuel cell system which is such that a desulfurizer is heated by the use of a high-temperature exhaust gas produced during the power generation in the solid oxide fuel cell.

To allow a desulfurizer to be operated at an appropriate temperature, for example, Japanese Unexamined Patent Application Publication No. 10-214632 discloses a fuel cell power generation apparatus configured such that the desulfurizer is fitted with a temperature sensor for detecting the inside temperature and with a cooling unit that decreases the temperature of the desulfurizer to a prescribed temperature based on signals from the temperature sensor. In the fuel cell power generation apparatus disclosed in Japanese Unexamined Patent Application Publication No. 10-214632, it is proposed that the cooling unit be such that a cooling fluid is passed through a cooling heat exchanger disposed in a hydrodesulfurizing catalyst layer or through a cooling pipe wound around the outer wall of the desulfurizer. The cooling fluid that is passed through the cooling unit is combustion air to be supplied to a combustor which heats a reformer.

Further, for example, Japanese Unexamined Patent Application Publication No. 2012-155978 proposes a fuel cell system which utilizes part of an oxidizing gas or cooling water as a cooling medium so that the temperature of an exhaust gas for heating the desulfurizer may be decreased to a prescribed temperature range. Specifically, as illustrated in FIG. 9, the fuel cell system described in Japanese Unexamined Patent Application Publication No. 2012-155978 is such that the temperature of an exhaust gas to be introduced into a desulfurizer 106 is decreased with a cooler 107 which utilizes a diverted part of an oxidizing gas as a cooling medium, to a prescribed range of temperatures allowing a desulfurizing catalyst to exhibit the performance appropriately.

However, these conventional fuel cell systems are still unsatisfactory in terms of power generation stability.

SUMMARY

In light of the circumstances described above, one non-limiting and exemplary embodiment provides a fuel cell system capable of higher power generation stability than heretofore achieved.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

A fuel cell system according to the present disclosure includes a hydrodesulfurizer that removes a sulfur compound in a raw material, a fuel cell that generates power using an oxidizing gas and a fuel gas obtained by reforming the raw material desulfurized with the hydrodesulfurizer, a heater that heats the hydrodesulfurizer by utilizing the heat of an exhaust gas circulated in the fuel cell system, an introduction passage disposed to guide the exhaust gas to the heater, and a gas supply unit that supplies a cooling gas to the exhaust gas being guided to the heater through the introduction passage, the cooling gas being not utilized in the power generation in the fuel cell system, wherein a mixture gas of the exhaust gas and the cooling gas supplied from the gas supply unit is passed through the inside of the heater.

These general and specific aspects may be implemented using a system and a method, and any combination of systems and methods.

The fuel cell system according to the present disclosure achieves higher power generation stability than heretofore possible.

Figure 1:
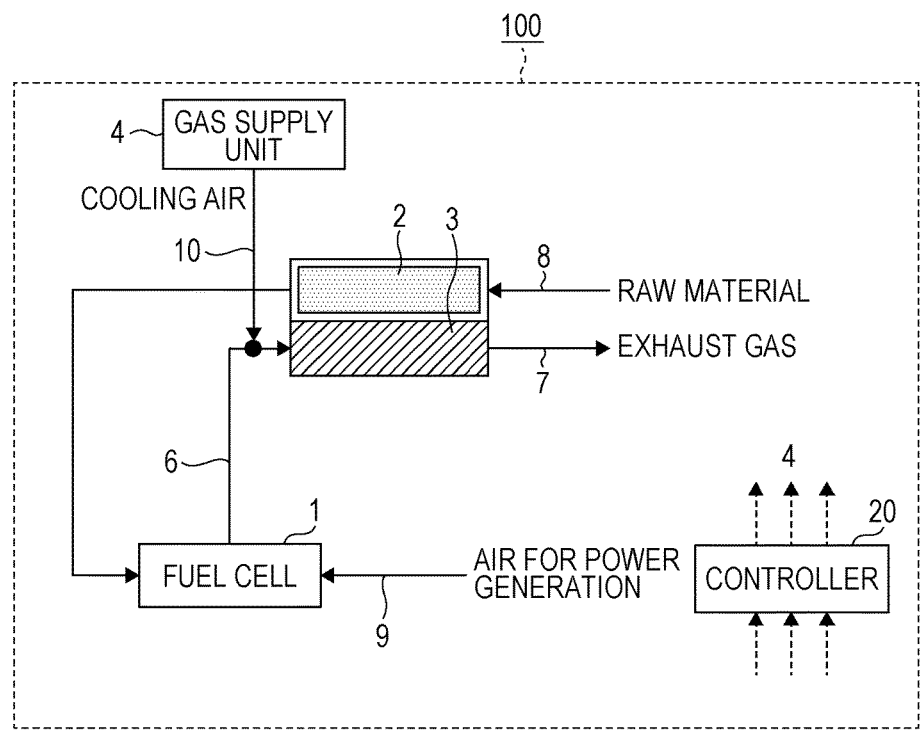
FIG. 1 is a block diagram illustrating an exemplary configuration of a fuel cell system according to an embodiment.

DETAILED DESCRIPTION (Circumstances that led to the Development of Aspects of the Present Disclosure)

The present inventor carried out extensive studies of the conventional fuel cell systems described in the section of "Description of the Related Art", and has obtained the following findings.

With the conventional configurations of fuel cell systems, overheating of a combustion exhaust gas discharged from the combustor due to, for example, any anomalies of the combustor may also cause the overheating of the desulfurizer that is heated by the combustion exhaust gas. Because the fuel cell system disclosed in, for example, Japanese Unexamined Patent Application Publication No. 10-214632 uses combustion air as the cooling medium to cool the hydrodesulfurizer, the overheating of the hydrodesulfurizer results in an increase in the amount of combustion air supplied to decrease the temperature of the hydrodesulfurizer by a greater amount of degrees. In some cases, such a heavy supply of combustion air may destabilize combustion in the combustor and may consequently lead to the destabilization of the amount of a fuel gas formed by the reforming reaction and finally to the destabilization of power generation in the fuel cell system.

The fuel cell system of Japanese Unexamined Patent Application Publication No. 2012-155978 uses an oxidizing gas to be supplied to the fuel cell, as the cooling medium to cool the hydrodesulfurizer. In the event that the hydrodesulfurizer is overheated, the amount of supply of the oxidizing gas is increased from the normal level in order to decrease the temperature of the hydrodesulfurizer by a greater amount of degrees. This causes a significant change in the heat balance in the fuel cell, giving rise to the risk that the power generation in the fuel cell system may be finally destabilized.

Thus, the fuel cell systems configured such that a gas utilized in the power generation in the systems also serves as the cooling medium to cool the hydrodesulfurizer have a risk that any overheating of the hydrodesulfurizer causes a significant change in the amount of supply of the cooling medium and finally the stability of power generation in the fuel cell systems is decreased.

The present inventor extensively studied this problem. As a result, the present inventor has found that the stability of power generation in fuel cell systems may be enhanced compared to the conventional systems by using, as the cooling medium, a gas that is not utilized in the power generation in the fuel cell systems. Further, the present inventor has found that the temperature of the hydrodesulfurizer may be controlled in an enhanced manner by configuring the system such that the cooling medium is supplied to an exhaust gas and the mixture gas of the exhaust gas and the cooling medium is heat exchanged with the hydrodesulfurizer.

A first aspect of the present disclosure provides a fuel cell system including a hydrodesulfurizer that removes a sulfur compound in a raw material, a fuel cell that generates power by electrochemical reaction using an oxidizing gas supplied thereto and a fuel obtained by reforming the raw material desulfurized with the hydrodesulfurizer, a heater that heats the hydrodesulfurizer by utilizing the heat of an exhaust gas circulated in the fuel cell system including the fuel cell, an introduction passage disposed to guide the exhaust gas to the heater, and a gas supply unit that supplies a cooling gas to the exhaust gas, the cooling gas being a gas not utilized in the power generation in the fuel cell system, wherein a mixture gas of the exhaust gas and the cooling gas supplied from the gas supply unit is passed through the inside of the heater.

Here, the desired range of heating temperatures for the hydrodesulfurizer is dependent on the type of a desulfurizing catalyst packed therein, and the temperature of the hydrodesulfurizer is controlled to fall in the appropriate temperature range.

According to the above configuration, the heater may heat the hydrodesulfurizer by utilizing the heat of the exhaust gas guided to the heater through the introduction passage. Even in the case where the temperature of the exhaust gas is increased above the level in normal operation due to any anomalies of the devices or any changes in loads during power generation, the temperature of the exhaust gas may be decreased to the desired temperature in accordance with the type of the desulfurizing catalyst packed in the hydrodesulfurizer by appropriately controlling the gas supply unit. Thus, the heater may be controlled to maintain the temperature of the hydrodesulfurizer within the appropriate temperature range in accordance with the type of the desulfurizing catalyst.

Further, the above fuel cell system is configured such that the mixture gas of the exhaust gas and the cooling gas supplied from the gas supply unit is passed through the inside of the heater. In the conventional systems where the desulfurizer is cooled directly with a cooling gas, the presence of the heater makes it difficult to dispose the cooler so as to enable cooling of the entirety of the desulfurizer. If the amount of supply of the cooling gas is increased in order to cool the desulfurizer, temperature variations are caused between the portions heated with the heater and the portions cooled with the cooler, easily resulting in temperature unevenness in the desulfurizer as a whole. In contrast, the above configuration in which the mixture gas of the cooling gas and the exhaust gas is passed through the inside of the heater makes it possible to adjust the temperature of the desulfurizer by heat exchange between the mixture gas and the desulfurizer. Thus, the desulfurizer may be prevented from being overheated while the temperature unevenness in the desulfurizer as a whole is reduced compared to the conventional level.

Further, the cooling gas used as the cooling medium to cool the exhaust gas elevated to a higher temperature than normal is not utilized in the power generation in the fuel cell system. Thus, the power generation in the fuel cell system will not be destabilized even if the cooling gas is supplied at an increased flow rate to suppress the overheating of the hydrodesulfurizer.

Thus, the fuel cell system according to the first aspect of the present disclosure achieves an enhancement in the stability of power generation compared to the conventional systems.

When, for example, the configuration involves a combustor, the exhaust gas circulated in the fuel cell system may be a combustion exhaust gas produced by the combustion in the combustor of excess fuel and excess air that are not used in the fuel cell. Alternatively, the exhaust gas may be excess air (a cathode off-gas) that is not used in the fuel cell.

The phrase that the gas is not utilized in the power generation in the fuel cell system means that the gas is different from the gases used in the power generation in the fuel cell system.

Here, the gases used in the power generation in the fuel cell system include gases that are used directly and indirectly in the power generation in the fuel cell system. For example, the gases directly used are the fuel gas and the oxidizing gas supplied to the fuel cell. For example, the gases indirectly used are gases used to produce the fuel gas, specifically, reaction gases that are used in the reforming reaction and gases that are used in the combustion to supply the reforming reaction heat. Examples of the gases used in the reforming reaction include raw materials, steam and air. Examples of the gases used in the combustion include fuel, combustion air, and off-fuel gas and off-oxidizing gas discharged from the fuel cell.

The cooling gas has a lower temperature than the exhaust gas.

The configuration of the above fuel cell system is not limited to any particular form as long as the mixture gas of the exhaust gas and the cooling gas supplied from the gas supply unit is passed through the inside of the heater. For example, the gas supply unit may supply the cooling gas to at least one of the introduction passage and the heater.

A second aspect of the present disclosure provides a fuel cell system according to the first aspect, wherein the fuel cell system may further include a heat exchanger that heats the oxidizing gas to be supplied to the fuel cell by utilizing the heat of the exhaust gas, and the introduction passage may be disposed to guide the exhaust gas heat-exchanged in the heat exchanger to the heater.

According to the above configuration, the oxidizing gas may be guided to the fuel cell after being heated (preheated) with the heat exchanger to an appropriate temperature in accordance with the operating temperature of the fuel cell. Because the heat exchanger utilizes part of the heat of the exhaust gas for the preheating of the oxidizing gas, the temperature of the exhaust gas may be decreased to a temperature that is appropriate to heat the hydrodesulfurizer. That is, the second aspect of the present disclosure allows the high-temperature exhaust gas to be guided to the heater after the exhaust gas is cooled to a temperature that is appropriate to heat the hydrodesulfurizer.

A third aspect of the present disclosure provides a fuel cell system according to the first or the second aspect, wherein the fuel cell system may further include control circuitry and a detector that detects the temperature of the hydrodesulfurizer, and the control circuitry may control the gas supply unit to increase the amount of supply of the cooling gas when the temperature detected with the detector has reached or exceeded an upper limit temperature.

According to the above configuration involving control circuitry and a detector, the control circuitry may control the gas supply unit to increase the amount of supply of the cooling gas when the temperature detected with the detector has reached or exceeded an upper limit temperature. This configuration thus allows the temperature of the hydrodesulfurizer to be maintained below the upper limit temperature. Consequently, the desulfurizing catalyst in the hydrodesulfurizer is prevented from undergoing extended overheating, and the desulfurization may be performed in the hydrodesulfurizer with high efficiency. Thus, the third aspect of the present disclosure eliminates the need of increasing the amount of the desulfurizing catalyst to increase the desulfurization efficiency, and realizes high desulfurization efficiency with a minimal amount of the desulfurizing catalyst to allow for the reduction in size of the hydrodesulfurizer.

The detectors include detectors that detect the temperature of the hydrodesulfurizer directly, and detectors that detect the temperature of the hydrodesulfurizer indirectly. The detectors that detect the temperature of the hydrodesulfurizer directly are detectors that detect the temperature of the hydrodesulfurizer, and are disposed on the hydrodesulfurizer. The detectors that detect the temperature of the hydrodesulfurizer indirectly are detectors that detect physical quantities (for example, the temperature) correlated to the temperature of the hydrodesulfurizer, and are, for example, detectors that detect the temperature of the heater.

A fourth aspect of the present disclosure provides a fuel cell system according to any one of the first to the third aspect, wherein the exhaust gas may include a combustion exhaust gas produced by the combustion of excess fuel gas and excess oxidizing gas unused in the power generation in the fuel cell.

According to the above configuration, the exhaust gas includes a combustion exhaust gas produced by the combustion of excess fuel and excess oxidizing gas unused in the power generation in the fuel cell, and the heat of the combustion exhaust gas may be effectively utilized by the heater to heat the hydrodesulfurizer.

A fifth aspect of the present disclosure provides a fuel cell system according to any one of the first to the third aspect, wherein the exhaust gas may include an excess oxidizing gas unused in the power generation in the fuel cell.

Here, the excess oxidizing gas unused in the power generation in the fuel cell has a high temperature as a result of, for example, being heated by the high operating temperature of the fuel cell.

According to the above configuration, the exhaust gas includes an excess oxidizing gas unused in the power generation in the fuel cell, and the heat of the excess oxidizing gas may be effectively utilized by the heater to heat the hydrodesulfurizer.

A sixth aspect of the present disclosure provides a fuel cell system according to the second aspect, wherein the gas supply unit may supply the cooling gas to a portion of the introduction passage located downstream from the heat exchanger and upstream from the heater.

According to the above configuration, the cooling gas may be supplied to a position downstream from the heat exchanger and upstream from the heater, namely, the cooling gas may be supplied to the exhaust gas before entry into the heater. Thus, even in the case where the temperature of the exhaust gas is increased above the level in normal operation due to any anomalies of the devices or any changes in loads during power generation, the exhaust gas may be cooled to an appropriate temperature before being supplied to the heater.

A seventh aspect of the present disclosure provides a fuel cell system according to any one of the first to the fifth aspect, wherein the gas supply unit may supply the cooling gas into the heater.

According to the above configuration, the cooling gas may be supplied into the heater. Thus, even in the case where the temperature of the exhaust gas is increased above the level in normal operation due to any anomalies of the devices or any changes in loads during power generation, the exhaust gas may be cooled to an appropriate temperature in the heater.

The sixth aspect and the seventh aspect represent exemplary configurations, and the configurations of the fuel cell systems are not limited to any particular forms as long as the mixture gas of the exhaust gas and the cooling gas supplied from the gas supply unit is passed through the inside of the heater.

An eighth aspect of the present disclosure provides a fuel cell system according to the first, the sixth or the seventh aspect, wherein the hydrodesulfurizer and the heater may be in contact with each other via one or more surfaces, and the fuel cell system may further include a heat insulator partially or entirely covering the hydrodesulfurizer and the heater.

According to the above configuration, the hydrodesulfurizer and the heater are in contact with each other via one or more surfaces, and consequently the heat of the exhaust gas may be transferred from the heater to the hydrodesulfurizer with high efficiency through the surfaces in contact together. Further, the heat insulator covering the hydrodesulfurizer and the heater may prevent the release of heat from both the hydrodesulfurizer and the heater.

A ninth aspect of the present disclosure provides a fuel cell system according to the first, the sixth or the seventh aspect, wherein the heater may include a housing accommodating the hydrodesulfurizer placed therein, and a flow passage disposed to circulate the exhaust gas in the housing, and the flow passage may be disposed on an outer periphery of the hydrodesulfurizer.

According to the above configuration, the exhaust gas is circulated on the outer periphery of the hydrodesulfurizer accommodated in the housing, and consequently the heater may heat the entirety of the hydrodesulfurizer uniformly.

Hereinbelow, an embodiment of the present disclosure will be described with reference to the drawings. In the following description, equivalent or corresponding components illustrated in the figures will be indicated with the same reference numerals and the same description of such components will not be repeated.

Embodiment

A fuel cell system 100 according to an embodiment will be described with reference to FIG. 1. While the present embodiment illustrates a fuel cell system having a solid oxide fuel cell as a fuel cell 1, the fuel cell 1 is not limited to a solid oxide fuel cell. FIG. 1 is a block diagram illustrating an exemplary configuration of the fuel cell system 100 according to the present embodiment.

As illustrated in FIG. 1, the fuel cell system 100 includes a fuel cell 1 (a solid oxide fuel cell), a hydrodesulfurizer 2, a heater 3, a gas supply unit 4 and control circuitry 20.

The fuel cell 1 generates power by electrochemical reaction using a fuel obtained by reforming a raw material (a raw material gas) desulfurized with the hydrodesulfurizer 2, and an oxidizing gas supplied thereto through an air supply passage 9. The fuel cell system 100 is configured such that the raw material may be supplied to the fuel cell 1 through a raw material passage 8. The raw material may be city gas or may be a gas based on a hydrocarbon such as propane gas. In the specification, the term "fuel" indicates a reformed gas that has been desulfurized by the removal of sulfur components from the raw material and has been reformed by a reforming reaction.

The fuel cell 1 has an anode to which the fuel is supplied, and a cathode to which the oxidizing gas is supplied. A plurality of fuel cell unit cells that generate power by electrochemical reaction between the anode and the cathode may be connected in series to form a cell stack. The fuel cell 1 may be also configured by connecting in parallel such series-connected cell stacks.

For example, the fuel cell unit cells that constitute the fuel cell 1 may have solid electrolytes such as yttria-stabilized zirconia (YSZ), ytterbium, scandium-stabilized zirconia, and lanthanum gallate. When, for example, the fuel cell unit cells include YSZ, the power generation reaction takes place in the temperature range of approximately from 600 to 900° C., although variable depending on thickness.

The fuel cell system 100 in the present embodiment may be configured such that the fuel cell system 100 includes a combustor that generates a combustion exhaust gas by combusting the excess fuel and the excess oxidizing gas unused in the fuel cell 1, and this combustion exhaust gas is guided as an exhaust gas to the heater 3 through an introduction passage 6. Alternatively, the configuration may be such that the unused oxidizing gas that has been heated by the high operating temperature of the fuel cell 1 is guided as an exhaust gas to the heater 3 through the introduction passage 6.

Although not particularly illustrated in FIG. 1, the configuration may be such that the system includes a reformer (not shown) in the raw material passage 8 between the hydrodesulfurizer 2 and the fuel cell 1, and the raw material desulfurized in the hydrodesulfurizer 2 is reformed with the reformer. Because solid oxide fuel cells operate at high temperatures of approximately from 600 to 900° C., the configuration may be such that the raw material is steam reformed (internally reformed) in the fuel cell 1 by the catalytic action of nickel that is the main component of the anode.

The hydrodesulfurizer 2 removes sulfur compounds in the raw material by utilizing hydrogen. That is, the hydrodesulfurizer 2 removes sulfur components in the raw material by the so-called hydrodesulfurization process. The raw material passage 8 is connected to the hydrodesulfurizer 2, and the raw material supplied from the outside is allowed to flow into the hydrodesulfurizer 2 through the raw material passage 8. Although not particularly illustrated in FIG. 1, the raw material flowing into the hydrodesulfurizer 2 includes hydrogen. The hydrogen present in the raw material may be supplied from the outside, or may be, for example, a part of the reformed gas occurring from the reformation in the reformer (not shown).

A desulfurizing catalyst is packed in the hydrodesulfurizer 2. Examples of the desulfurizing catalysts include desulfurizing catalysts containing copper and zinc. The desulfurizing catalysts are not limited to such desulfurizing catalysts as long as they can catalyze hydrodesulfurization, and may be combinations of NiMo-based or CoMo-based catalysts and zinc oxide. In the case where the desulfurizing catalyst is a combination of a NiMo-based or CoMo-based catalyst and zinc oxide, the hydrodesulfurizer 2 performs the hydrocracking of organic sulfur in the fuel gas at temperatures in the range of 350 to 400° C., and removes the resultant H2S by adsorbing it to ZnO at temperatures in the range of 350 to 400° C.

When, for example, the raw material is city gas, the gas contains a sulfur-containing odorant compound, namely, dimethyl sulfide (DMS, C2H6S). In the hydrodesulfurizer 2, this DMS is removed by the action of the desulfurizing catalyst as ZnS through the reactions represented by the following reaction formulae (1) and (2), or by physical adsorption.

　　　(1)

　　　(2)

The odorants are not limited to DMS, and may be other sulfur compounds such as TBM (C4H10S) and THT (C4H8S).

When the desulfurizing catalyst that is packed contains copper and zinc, the hydrodesulfurizer 2 performs desulfurization in the temperature range of approximately from 10 to 400° C., or approximately from 150 to 300° C. Such CuZn-based desulfurizing catalysts are capable of physical adsorption in addition to the hydrodesulfurization performance, and mainly exhibit physical adsorption capability at low temperatures and chemical adsorption capability (H2S+

ZnO→H2O+ZnS) at high temperatures. In this case, the sulfur content in the fuel gas after desulfurization is reduced to 1 vol ppb (parts per billion) or less, and usually to 0.1 vol ppb or less.

When the hydrodesulfurizer 2 is packed with a combination of a NiMo-based or CoMo-based catalyst with zinc oxide, or a desulfurizing catalyst containing copper and zinc as described above, the desulfurization can remove the sulfur components in an increased amount per unit volume of the catalyst. Thus, the use of the aforementioned desulfurizing catalysts allows for the removal of sulfur components to a desired sulfur concentration with a reduced amount of the desulfurizing catalyst.

A degradation of the desulfurizing catalyst in the hydrodesulfurizer 2 during extended operation of the fuel cell system 100 leads to a deterioration of the performance of the fuel cell system 100. Thus, the hydrodesulfurizer 2 may be detachably disposed in the fuel cell system 100 and may be replaced by a new hydrodesulfurizer 2 when the desulfurizing catalyst has been degraded.

Headers (not shown) are disposed near the inlet port and near the outlet port of the hydrodesulfurizer 2 to allow the raw material to flow into the desulfurizing catalyst with substantially uniform pressure and, after being passed through the desulfurizing catalyst, to flow into the raw material passage 8 through the outlet port with substantially uniform pressure.

The raw material that has been desulfurized with the hydrodesulfurizer 2 as described above is supplied to the fuel cell 1 and internally reformed, or is supplied to the reformer and reformed in the reformer. The reformer may be a partial oxidation reformer. It is, however, advantageous to design the reformer to be able to perform not only the partial oxidation reforming reaction but also the steam reforming reaction to realize higher operation efficiency.

The heater 3 is configured to heat the hydrodesulfurizer 2 by utilizing the heat of the exhaust gas circulated in the fuel cell system 100. Specifically, the exhaust gas is guided to the heater 3 through the introduction passage 6 and is circulated through the inside of the heater 3 to give part of the heat of the exhaust gas to the hydrodesulfurizer 2, thereby heating the hydrodesulfurizer 2 to a desired temperature. That is, the heater 3 includes a distribution route through which the exhaust gas is circulated. Specifically, a plurality of baffle boards (not shown) are formed in the inside of the heater 3, and the exhaust gas is caused to flow in a zigzag manner by the baffle boards and is thereafter discharged through an exhaust gas discharging passage 7. The lower the temperature of the exhaust gas being discharged, the smaller the amount of thermal energy discharged to the outside. In view of this, the exhaust gas temperature is desirably about 200° C.±50° C.

The exteriors (the containers) of the hydrodesulfurizer 2 and the heater 3 are composed of metals such as stainless steel. The hydrodesulfurizer 2 and the heater 3 are in contact with each other via one or more surfaces. When the exhaust gas is passed through the distribution route inside the heater 3, the heat of the exhaust gas is transferred from the heater 3 to the hydrodesulfurizer 2 through the surfaces in contact together. In this manner, the desulfurizing catalyst in the hydrodesulfurizer 2 is maintained at an appropriate temperature.

The gas supply unit 4 is configured to supply a cooling gas to the exhaust gas being guided to the heater 3 through the introduction passage 6. For example, the gas supply unit 4 is composed of a pump that supplies air from the outside of the fuel cell system 100 as the cooling gas, and a flow control valve that adjusts the flow rate of the cooling gas supplied from the pump. The flow rate of the cooling gas supplied from the pump is adjusted by the flow control valve, and the cooling gas is supplied at the controlled flow rate through a cooling gas passage 10 to meet the exhaust gas being circulated through the introduction passage 6. Thus, the cooling structure is such that the cooling gas is mixed together with the exhaust gas to decrease the temperature of the exhaust gas. With this cooling structure, the temperatures of the heater 3 and the hydrodesulfurizer 2 are controlled to fall in the desired temperature ranges. That is, the desired temperature range of the hydrodesulfurizer 2 may be understood as the temperatures to which the hydrodesulfurizer 2 is controlled. In the present embodiment, the desired temperature range is set to temperatures from 200° C. to 300° C. when the desulfurizing catalyst packed in the hydrodesulfurizer 2 contains copper and zinc; however, the desired temperature range is not limited to the above temperatures and may be determined appropriately in consideration of factors such as the materials of the desulfurizing catalyst and the desired accuracy of desulfurization in the hydrodesulfurizer 2.

While the gas supply unit 4 has been illustrated as being composed of a pump and a flow control valve, the pump may be replaced by other device having an air supply function such as a blower or a fan. The flow control valve may be any type of valves having a flow rate adjustment function. In the case where the pump has a flow rate adjustment function equivalent to a flow control valve, the flow control valve may be omitted as appropriate. While the cooling gas in the present embodiment is air from the outside of the fuel cell system 100, the cooling gas is not limited thereto and may be any of gases that are not utilized in the power generation in the fuel cell system 100.

The control circuitry 20 is configured to perform various controls of the sections in the fuel cell system 100. For example, the control circuitry 20 may control the gas supply unit 4 to supply the cooling gas in a controlled manner. In the fuel cell system 100 of the present embodiment, in particular, the control circuitry 20 may control the gas supply unit 4 to increase the amount of supply of the cooling gas when the temperature of the hydrodesulfurizer 2 is detected to have reached or exceeded an upper limit temperature. Details of this controlling will be described later. For example, the control circuitry 20 may include a processor such as MPU or CPU and a storage such as a memory, and may perform various controls in such a manner that the processor such as CPU reads and executes the program stored in the memory. Here, the upper limit temperature is the upper limit of the temperatures to which the hydrodesulfurizer 2 is controlled.

Figure 2:
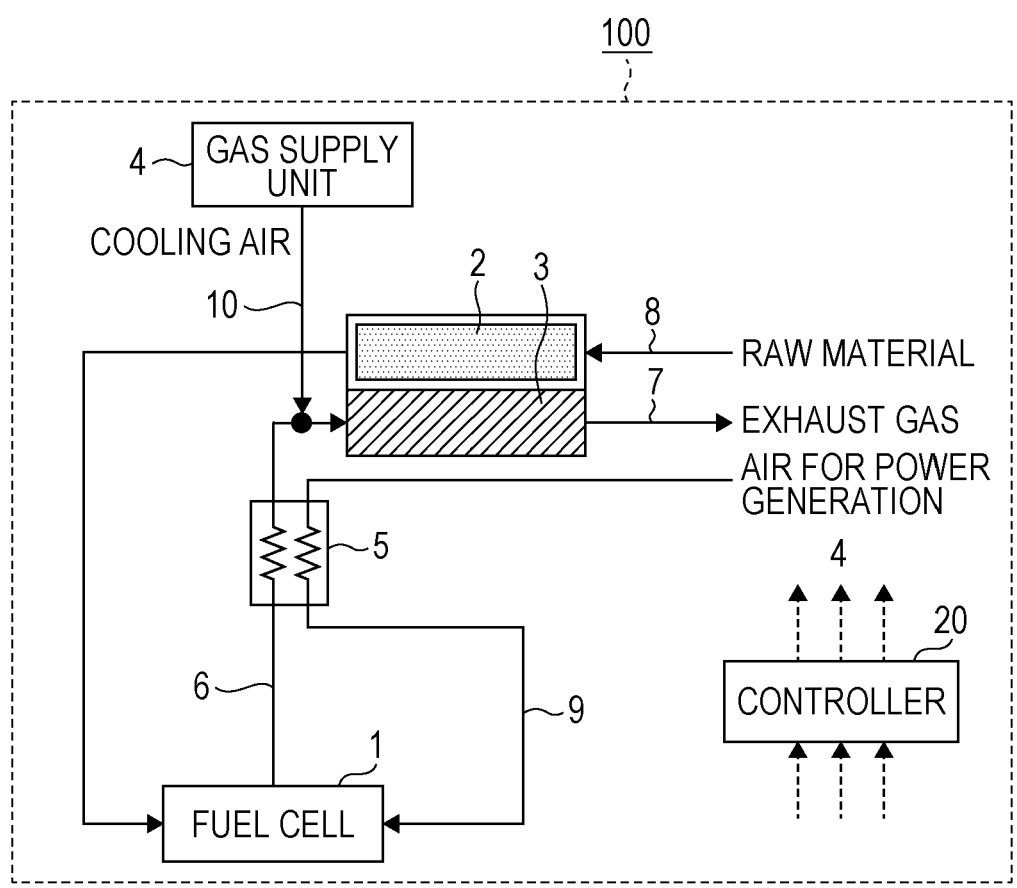
FIG. 2 is a block diagram illustrating an exemplary configuration of a fuel cell system according to the embodiment.

Further, as illustrated in FIG. 2, the fuel cell system 100 according to the present embodiment may include a heat exchanger 5. FIG. 2 is a block diagram illustrating an exemplary configuration of the fuel cell system 100 of the present embodiment. FIG. 2 illustrates a configuration of the fuel cell system 100 including the heat exchanger 5.

The heat exchanger 5 is configured to heat (preheat) the oxidizing gas to be supplied to the fuel cell 1, by utilizing the heat of the exhaust gas. That is, the heat exchanger 5 heats the oxidizing gas supplied from the outside to a prescribed temperature by heat exchange with the exhaust gas. For example, the oxidizing gas is heated to 400 to 800° C. by being passed through the heat exchanger 5. Such a heated oxidizing gas is then supplied to the fuel cell 1. When the fuel cell system 100 further includes the heat exchanger 5, the configuration is such that the exhaust gas loses part of its heat by the heat exchange with the oxidizing gas in the heat exchanger 5, and the resultant exhaust gas having a decreased temperature is guided to the heater 3. Thus, the fuel cell system 100 is configured such that the exhaust gas having a high temperature of 400 to 800° C. is guided to the heater 3 after being cooled in the heat exchanger 5 to a temperature that is appropriate to heat the hydrodesulfurizer 2.

Figure 3:
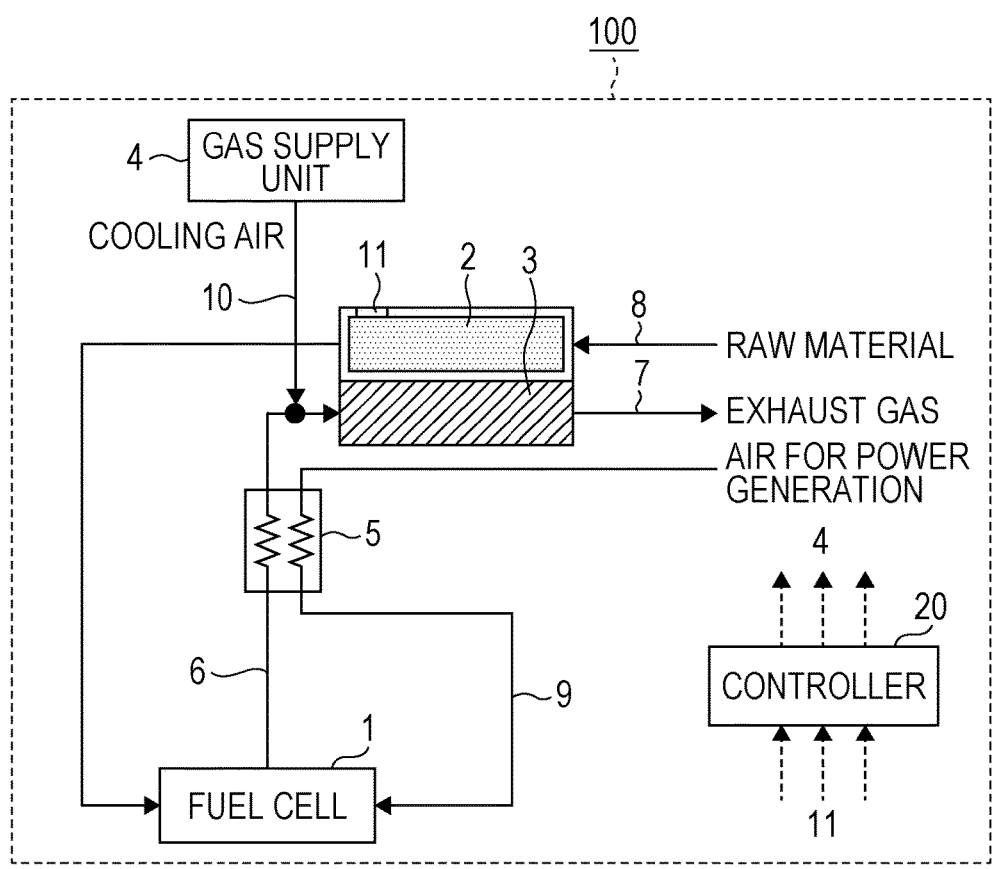
FIG. 3 is a block diagram illustrating an exemplary configuration of a fuel cell system according to the embodiment.

Further, as illustrated in FIG. 3, the fuel cell system 100 according to the present embodiment may include a detector 11. FIG. 3 is a block diagram illustrating an exemplary configuration of the fuel cell system 100 of the present embodiment. FIG. 3 illustrates a configuration of the fuel cell system 100 including the detector 11.

The detector 11 detects the temperature of the hydrodesulfurizer 2. While FIG. 3 illustrates the detection of the temperature of the hydrodesulfurizer 2, the configuration may be such that the temperature of the heater 3 is detected. The configuration for detecting the temperature of the heater may be such that the detector 11 is disposed in the housing or in the distribution route formed in the inside of the heater 3 for the passage of the exhaust gas. The detector 11 notifies the control circuitry 20 of the detection results.

Upon receiving the detection results from the detector 11, the control circuitry 20 determines whether or not the temperature detected by the detector 11 has reached or exceeded the upper limit temperature. When the control circuitry 20 concludes that the detected temperature has reached or exceeded the upper limit temperature, the control circuitry 20 controls the gas supply unit 4 to increase the amount of supply of the cooling gas. In accordance with the control instruction from the control circuitry 20, the gas supply unit 4 adjusts the opening degree of the flow control valve (the switch valve) and the pump output to prescribed values, and the cooling gas is supplied to the introduction passage 6 through the cooling gas passage 10. By mixing the cooling gas together with the exhaust gas in this manner, the temperature of the exhaust gas may be decreased. Further, the adjustment of the flow rate of the cooling gas being supplied makes it possible to adjust with high accuracy the temperature of the exhaust gas flowing into the heater 3.

Here, the upper limit temperature is the upper limit of the temperatures to which the hydrodesulfurizer 2 is controlled. When, for example, the desulfurizing catalyst packed in the hydrodesulfurizer 2 contains copper and zinc, the upper limit temperature is set to 300° C.

When, on the other hand, the control circuitry 20 concludes that the temperature detected by the detector 11 has been decreased to or below a lower limit temperature, the control circuitry 20 controls the gas supply unit 4 to suspend the supply of the cooling gas. In accordance with the control instruction from the control circuitry 20, the gas supply unit 4 closes the flow control valve (the switch valve) and stops the cooling gas pumping output. In the present embodiment, the cooling structure according to the present disclosure is realized by the detector 11, the gas supply unit 4, the cooling gas passage 10 and the control circuitry 20.

Here, the lower limit temperature is the lower limit of the temperatures to which the hydrodesulfurizer 2 is controlled. When, for example, the desulfurizing catalyst packed in the hydrodesulfurizer 2 contains copper and zinc, the lower limit temperature is set to 200° C.

While the configuration described above is such that the flow rate of the cooling gas supplied to the exhaust gas is adjusted based on the results of temperature detection by the detector 11, the configuration is not limited thereto and may be such that, for example, a storage such as a memory (not shown) is provided which includes a preinstalled data table that correlates the lapse of time from the start of the operation of the fuel cell system 100 with the flow rate of the cooling gas supplied to the exhaust gas, and the control circuitry 20 adjusts the flow rate of the cooling gas supplied from the gas supply unit 4 to the exhaust gas with reference to the data table. When such a configuration is adopted, the fuel cell system 100 will include a time measurement system such as a timer to measure the time from the start of the operation, in place of the detector 11.

Although not particularly illustrated in FIGS. 1 to 3, the configuration may be such that the fuel cell 1, the hydrodesulfurizer 2 and the heater 3 are disposed in a housing 30 having a heat insulator 31 on the wall surface (see FIG. 4 discussed later). When such a configuration is adopted, the fuel cell 1, the hydrodesulfurizer 2 and the heater 3 may be accommodated in the single housing 30 and consequently a decrease in the efficiency in the utilization of the heat of the exhaust gas due to heat release may be prevented. Hereinbelow, Example of the fuel cell system 100 having a configuration in which the fuel cell 1, the hydrodesulfurizer 2 and the heater 3 are accommodated in the housing 30 will be described with reference to FIG. 4.

EXAMPLE

Figure 4:
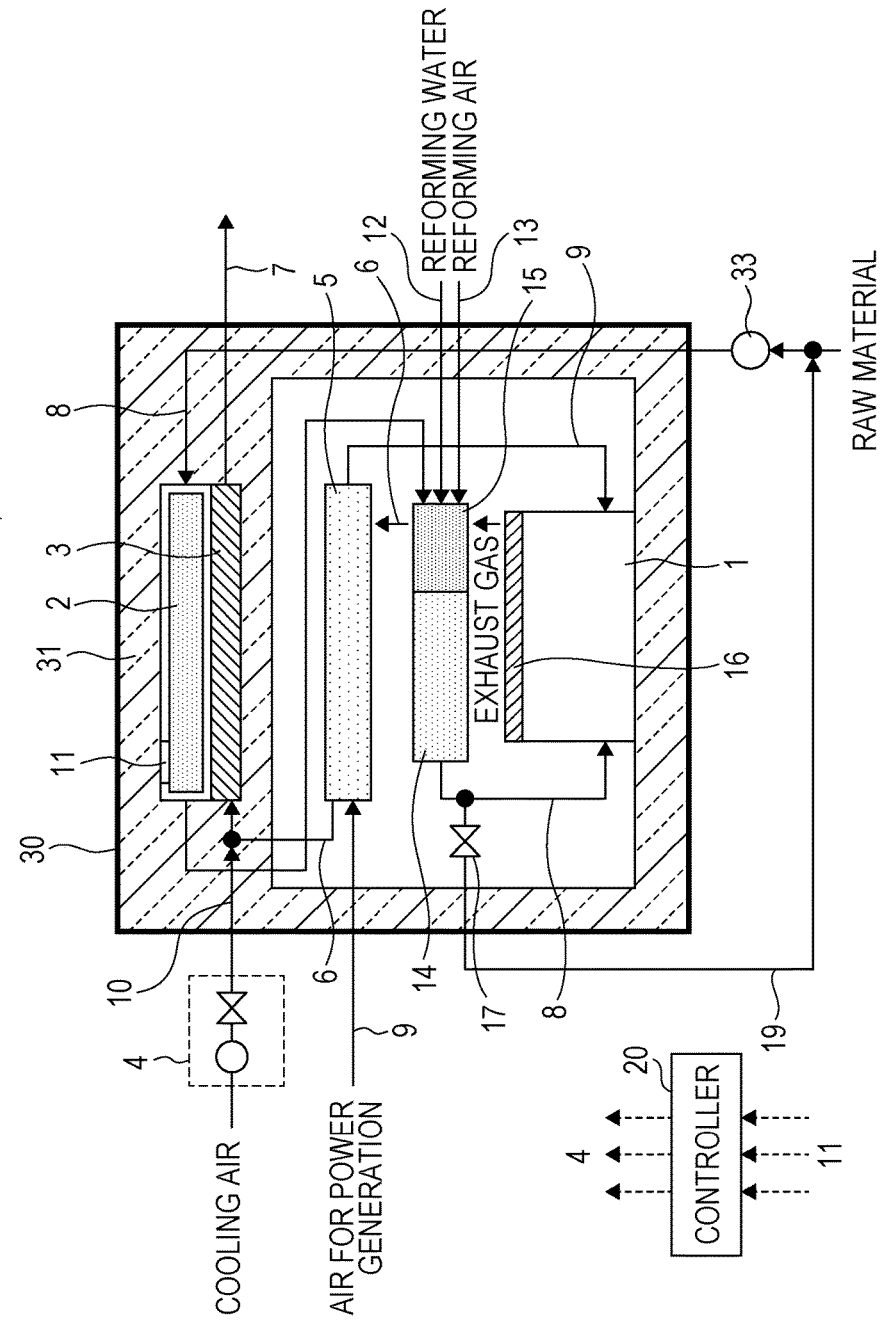
FIG. 4 is a view schematically illustrating a configuration example of a fuel cell system in Example.

Specifically, the fuel cell system 100 according to the present embodiment may be configured as illustrated in FIG. 4. FIG. 4 is a view schematically illustrating a configuration example of the fuel cell system 100 in Example. In the example illustrated in FIG. 4, the fuel cell system 100 includes the fuel cell 1, the hydrodesulfurizer 2, the heater 3, the gas supply unit 4 and the heat exchanger 5, and further includes a combustor 16, a reformer 14, an evaporator 15, a decompressor 17 and a booster 33. The fuel cell 1, the heat exchanger 5, the reformer 14 and the evaporator 15 are disposed in the space surrounded by the heat insulator 31, and the hydrodesulfurizer 2 and the heater 3 are disposed within the heat insulator 31.

In this case, the reformer 14 in the fuel cell system 100 may be configured as described below. The reformer 14 may be a partial oxidation reformer. It is, however, advantageous to design the reformer 14 to be able to perform not only the partial oxidation reforming reaction but also the steam reforming reaction to realize higher operation efficiency. For example, the evaporator 15 is disposed upstream from the reformer 14 in the raw material passage 8 so that water (reforming water) supplied through a reforming water passage 12 may be mixed together with the raw material desulfurized in the hydrodesulfurizer 2 and the mixture may be supplied to the reformer 14.

Here, the evaporator 15 is disposed in order to allow the steam reforming reaction to be performed in the reformer 14. The evaporator 15 evaporates the water (the reforming water) supplied through the reforming water passage 12, by utilizing the heat of the exhaust gas discharged from the combustor 16 and the heat radiated from the combustor 16. The resultant steam is then mixed together with the desulfurized raw material supplied from the hydrodesulfurizer 2. The evaporator 15 then guides the mixture of the raw material to the reformer 14.

The reforming catalyst packed in the reformer 14 may be appropriately selected from Ni-impregnated spherical Al2O3 (alumina) and ruthenium on spherical Al2O3.

During the startup of the fuel cell system 100, the amount of thermal energy is insufficient to perform the endothermic steam reforming reaction in the reformer 14. Thus, during the startup of the fuel cell system 100, no water is supplied to the evaporator 15 through the reforming water passage 12, and reforming air is introduced to the reformer 14 through a reforming air passage 13 to allow the reformer 14 to perform the partial oxidation reforming reaction represented by the following formula (3), generating hydrogen gas and carbon monoxide.

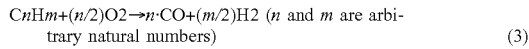

$$C_nH_m+(n/2)O_2 \rightarrow n \cdot CO+(m/2)H_2 \text{ (} n \text{ and } m \text{ are arbitrary natural numbers)} \quad (3)$$

The resultant hydrogen gas and carbon monoxide are supplied to the fuel cell 1 through the raw material passage 8, and are allowed to undergo the electrochemical reaction with the oxidizing gas to generate power.

With the progress of power generation after the activation of the fuel cell system 100, the temperature of the reformer 14 is gradually increased. That is, the temperature of the reformer 14 is increased by the exothermic partial oxidation reforming reaction represented by the above formula (3), as well as by the exhaust gas. When the temperature of the reformer 14 reaches, for example, 400° C. or above, it becomes possible to perform the steam reforming reaction represented by the following formula (4) in parallel with the above reaction.

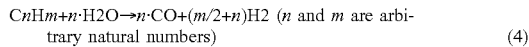

$$C_nH_m+n \cdot H_2O \rightarrow n \cdot CO+(m/2+n)H_2 \text{ (} n \text{ and } m \text{ are arbitrary natural numbers)} \quad (4)$$

The steam reforming reaction represented by the above formula (4) produces a larger amount of hydrogen from the same amount of the hydrocarbon (CnHm) than does the partial oxidation reforming reaction represented by the formula (3), and hence produces a larger amount of the reformed gas usable in the power generation reaction in the fuel cell 1. That is, the steam reforming reaction can produce the reformed gas more efficiently. Because the steam reforming reaction represented by the formula (4) is an endothermic reaction, the progress of the steam reforming reaction may be helped by the heat such as the heat generated by the partial oxidation reforming reaction represented by the formula (3), and the heat of the exhaust gas. When the temperature of the reformer 14 reaches, for example, 600° C. or above, the heat amount required for the steam reforming reaction of the formula (4) may be met by the heat available from other than the partial oxidation reforming reaction, for example, by the heat of the exhaust gas alone. The fuel cell system 100 may be then fueled by the steam reforming reaction alone.

In the configuration of the fuel cell system 100 illustrated in FIG. 4, the raw material passage 8 is branched between the reformer 14 and the fuel cell 1. From the branch portion, a recycle passage 19 extends through which part of the reformed gas produced in the reformer 14 is returned to the raw material passage 8. Thus, hydrogen may be added to the raw material to be supplied to the hydrodesulfurizer 2, and the hydrodesulfurizer 2 may perform hydrodesulfurization utilizing this hydrogen.

In the configuration of the fuel cell system 100 illustrated in FIG. 4, the decompressor 17 is disposed in the recycle passage 19 near the branch portion between the raw material passage 8 and the recycle passage 19. The decompressor 17 adjusts the flow rate of the reformed gas circulated in the recycle passage 19, and may be realized with, for example, a capillary tube or the like. That is, the decompressor 17 is configured such that the capillary tube or the like provides a narrow flow passage to increase the pressure loss and thereby allows the reformed gas to be circulated in the recycle passage 19 at a desired flow rate. The decompressor 17 may be located outside the housing 30, but is desirably located inside the housing 30 because the hot environment prevents water condensation.

Further, the configuration may be such that a condenser (not shown) is disposed in the recycle passage 19. When the configuration involves a condenser, water resulting from a temperature drop of the reformed gas being circulated in the recycle passage 19 may be recovered by the condenser to prevent problems such as clogging of the passage with condensed water, and the corrosion or breakage of the booster 33 with condensed water.

(Flow of Exhaust Gas, Adjustment of Exhaust Gas Temperature, and Heating of Desulfurizer)

The flow of the exhaust gas, the adjustment of the exhaust gas temperature, and the heating of the desulfurizer will be described with respect to the configuration of the fuel cell system 100 illustrated in FIG. 4. Specifically, the hydrodesulfurizer 2 is heated by circulating the exhaust gas in the following manner. In the case of the fuel cell system 100 illustrated in FIG. 4, the exhaust gas utilized to heat the hydrodesulfurizer 2 is a combustion exhaust gas produced by combusting the excess fuel and the excess air in the combustor 16.

The flow rate and the temperature of the exhaust gas (the combustion exhaust gas) produced in the combustor 16 may be controlled by adjusting the fuel utilization efficiency in the consumption of the fuel and the oxidizing gas in the fuel cell 1 (the rate of fuel consumption in the fuel cell 1 during power generation). In the fuel cell system 100 illustrated in FIG. 4, for example, the fuel utilization efficiency in the consumption of the fuel and the oxidizing gas in the fuel cell 1 is set such that the temperature of the combustor 16 is in the range of approximately 600 to 900° C.

After the exhaust gas is produced by combusting the excess fuel and the excess oxidizing gas in the combustor 16 appropriately temperature-controlled as described above, the exhaust gas is first guided to heat the reformer 14 and the evaporator 15. As a result of this, part of the heat of the exhaust gas is consumed. Further, the resultant exhaust gas having a decreased temperature flows into the heat exchanger 5, and a further amount of the heat of the exhaust gas is given off by the heat exchange between the oxidizing gas and the exhaust gas in the heat exchanger 5. Consequently, the exhaust gas is cooled to a temperature that is appropriate to heat the hydrodesulfurizer 2. The exhaust gas having a further decreased temperature is then supplied to the heater 3 through the introduction passage 6.

The exhaust gas as produced in the combustor 16 has a high temperature, for example, approximately 600 to 900° C. However, the temperature of the exhaust gas is decreased before the exhaust gas reaches the introduction passage 6 by the giving off of the heat to heat the reformer 14 and the evaporator 15 and further by heat exchange with the oxidizing gas in the heat exchanger 5.

When, in particular, the fuel cell 1 is a solid oxide fuel cell and a power of, for example, 1 kW is generated, the heat exchanger 5 requires a large amount of heat because the oxidizing gas supplied at 50 L/min or more is heated from the outside temperature to approximately 400 to 800° C. This heat amount is met by the heat amount of the exhaust gas.

In the manner described above, the temperature of the exhaust gas at entry into the heater 3 through the introduction passage 6 is adjusted to a desired temperature in consideration of factors such as the flow rate and the temperature of the exhaust gas produced in the combustor 16, the amount of heat absorbed by the reformer 14 and the evaporator 15, and the amount of heat absorbed in the heat exchanger 5.

Next, there will be described the desired temperature of the exhaust gas flowing into the heater 3. When the hydrodesulfurizer 2 is packed with a desulfurizing catalyst containing copper and zinc, the hydrodesulfurizer 2 is heated to a temperature suited for hydrodesulfurization (approximately 150 to 300° C.) by supplying the exhaust gas to the heater 3 such that the temperature of the exhaust gas entering the heater 3 is controlled to approximately 150 to 350° C. by adjusting parameters such as the flow rate and the temperature of the exhaust gas produced in the combustor 16, the amount of heat absorbed by the reformer 14 and the evaporator 15, and the amount of heat absorbed in the heat exchanger 5.

When, on the other hand, the hydrodesulfurizer 2 is packed with a desulfurizing catalyst that is a combination of a NiMo-based or CoMo-based catalyst and zinc oxide, the temperature of the exhaust gas entering the heater 3 is controlled to approximately 350 to 450° C. by adjusting parameters such as the flow rate and the temperature of the exhaust gas produced in the combustor 16, the amount of heat absorbed by the reformer 14 and the evaporator 15, and the amount of heat absorbed in the heat exchanger 5.

By arranging the heater 3 in the exhaust gas passage according to the above configuration, the hydrodesulfurizer 2 may be controlled to a desired temperature suited for hydrodesulfurization. Further, the hydrodesulfurizer 2, the heater 3, the introduction passage 6 and the exhaust gas discharging passage 7 are disposed to be covered with the heat insulator 31 as far as possible. With such a configuration, the release of heat from the hydrodesulfurizer 2 may be prevented, and the hydrodesulfurizer 2 may be prevented from direct exposure to the high temperature of 500 to 600° C. inside the housing 30.

By covering the hydrodesulfurizer 2 with the heat insulator 31, the temperature distribution in the heater 3 and the hydrodesulfurizer 2 may be rendered uniform as much as possible and thus temperature variations may be suppressed. Consequently, the temperature of the hydrodesulfurizer 2 may be controlled easily.

Even when, however, the configuration is such that the hydrodesulfurizer 2, the heater 3, the introduction passage 6 and the exhaust gas discharging passage 7 are disposed within the heat insulator 31 as described above, the temperature of the hydrodesulfurizer 2 is increased by, for example, the high-temperature heat radiated from the combustor 16 and the heat of the exhaust gas inside the housing 30 that are transferred through the heat insulator 31. Consequently, the hydrodesulfurizer 2 is overheated at times. For example, the desulfurizer may be overheated when any anomalies occur in the combustor 16 to raise the temperature in the housing (the inner housing) accommodating the combustor section to a higher level than necessary. During low-load operation (when the power generation is small), the oxidizing gas is supplied to the fuel cell 1 at a decreased flow rate. Consequently, the temperature of the exhaust gas discharged from the heat exchanger 5 is increased and thus the temperature of the exhaust gas introduced into the heater 3 is also increased, possibly resulting in the overheating of the heater 3 and the hydrodesulfurizer 2.

Thus, as described above, the fuel cell system 100 according to Example is configured such that when the detector 11 detects that the temperature has reached or exceeded the upper limit temperature, the control circuitry 20 instructs the gas supply unit 4 to supply the cooling gas from the outside at a prescribed flow rate into the introduction passage 6. During this process, the detector 11 monitors the temperature so that a prescribed temperature will be reached in a predetermined time, while the control circuitry 20 performs feedback control based on the temperatures detected by the detector 11. In this manner, the fuel cell system 100 according to Example may control the temperature of the hydrodesulfurizer 2 to avoid overheating.

Modified Example 1

Figure 5:
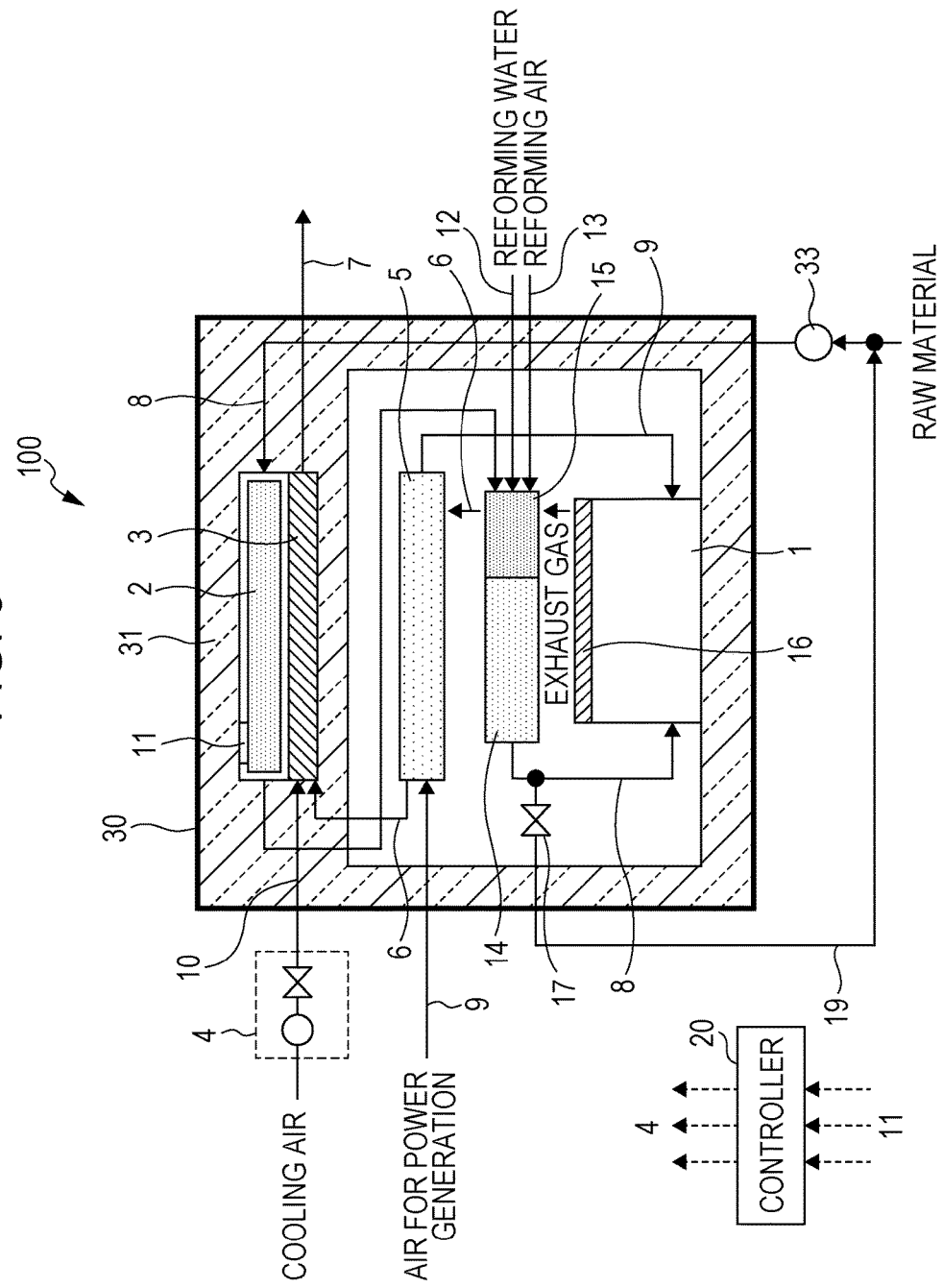
FIG. 5 is a view schematically illustrating an exemplary configuration of a fuel cell system according to Modified Example 1 modified from Example.

Next, Modified Example 1 of the fuel cell system 100 illustrated in Example will be described with reference to FIG. 5. FIG. 5 is a view schematically illustrating an exemplary configuration of the fuel cell system 100 according to Modified Example 1 modified from Example.

In the fuel cell system 100 according to Example described above, the configuration is such that the cooling gas supplied from the gas supply unit 4 is mixed together with the exhaust gas in the course of the introduction passage 6. The fuel cell system 100 according to Modified Example 1 differs from the fuel cell system 100 according to Example only in that the exhaust gas and the cooling gas are introduced into the heater 3 separately and are mixed with each other inside the heater 3.

In the fuel cell system 100 according to Modified Example 1, the above configuration makes it possible to eliminate the confluence between the cooling gas passage 10 and the introduction passage 6, namely, the merging of the exhaust gas and the cooling gas before entry into the heater 3. Consequently, the piping configuration of the introduction passage 6 and the cooling gas passage 10 may be significantly simplified, and the size of the fuel cell system 100 may be miniaturized.

Modified Example 2

Figure 6:
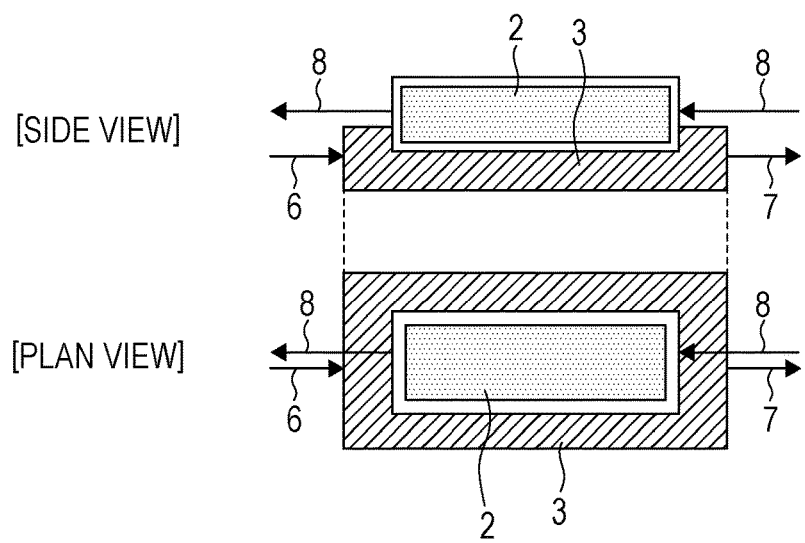
FIG. 6 is a view illustrating an exemplary arrangement of a hydrodesulfurizer and a heater in a fuel cell system according to Modified Example 2 modified from Example.

In the fuel cell system 100 according to Example described above, the configuration is such that the hydrodesulfurizer 2 is disposed on the heater 3 via a plane contact, namely, the bottom surface of the hydrodesulfurizer 2 is in plane contact with the top surface of the heater 3 as illustrated in FIG. 4. However, the arrangement of the hydrodesulfurizer 2 and the heater 3 is not limited to this configuration. For example, as illustrated in FIG. 6, the hydrodesulfurizer 2 and the heater 3 may be both rectangular in shape and may be arranged such that the surface (the bottom surface) and the four peripheral side surfaces of the hydrodesulfurizer 2 adjacent to the heater 3 are covered with the heater 3. That is, the configuration of the fuel cell system 100 according to Modified Example 2 is the same as the fuel cell system 100 illustrated in FIG. 4 except that the hydrodesulfurizer 2 and the heater 3 have a different arrangement.

FIG. 6 is a view illustrating an exemplary arrangement of the hydrodesulfurizer 2 and the heater 3 in the fuel cell system 100 according to Modified Example 2 modified from Example. In FIG. 6, the upper view is a side view and the lower view is a plan view of the hydrodesulfurizer 2 and the heater 3.

In the fuel cell system 100 according to Modified Example 2 modified from Example, as illustrated in FIG. 6, the number of the contact surfaces between the hydrodesulfurizer 2 and the heater 3 is increased from one surface to five surfaces, and thereby the heat may be transferred from the heater 3 to the hydrodesulfurizer 2 with further enhanced efficiency. Consequently, the temperature of the hydrodesulfurizer 2 may be controlled easily, quickly and accurately.

In the fuel cell system 100 of FIG. 6 according to Modified Example 2 modified from Example, the configuration is such that the cooling gas supplied from the gas supply unit 4 is mixed together with the exhaust gas in the course of the introduction passage 6. Similarly to Modified Example 1, the system may be configured such that the exhaust gas and the cooling gas are introduced into the heater 3 separately and are mixed with each other inside the heater 3.

Modified Example 3

Figure 7:
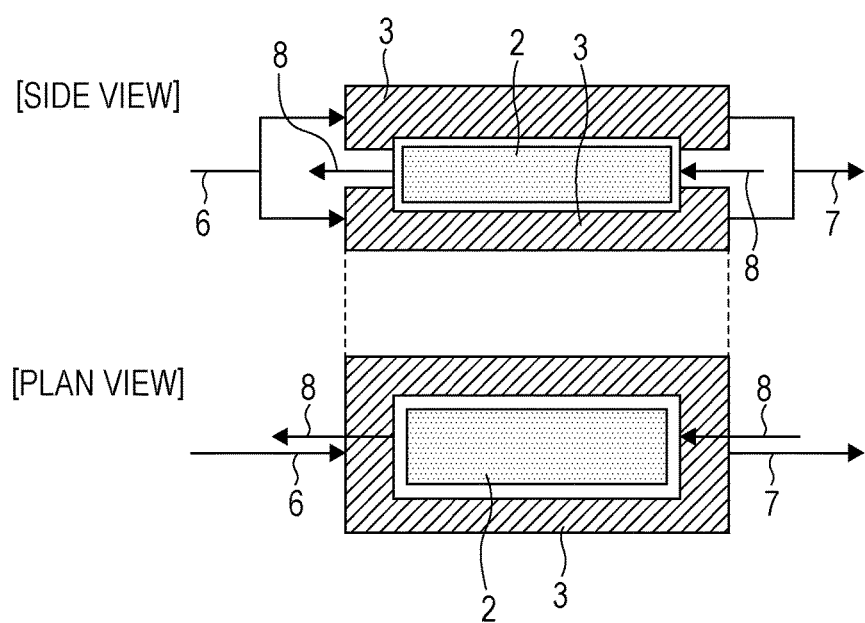
FIG. 7 is a view illustrating an exemplary arrangement of a hydrodesulfurizer and a heater in a fuel cell system according to Modified Example 3 modified from Example.

Further, the hydrodesulfurizer 2 and the heater 3 may be arranged as illustrated in FIG. 7. That is, the configuration of the fuel cell system 100 according to Modified Example 3 is the same as the fuel cell system 100 illustrated in FIG. 4 except that the hydrodesulfurizer 2 and the heater 3 are arranged as illustrated in FIG. 7.

FIG. 7 is a view illustrating an exemplary arrangement of the hydrodesulfurizer 2 and the heater 3 in the fuel cell system 100 according to Modified Example 3 modified from Example. In FIG. 7, the upper view is a side view and the lower view is a plan view of the hydrodesulfurizer 2 and the heater 3.

In the fuel cell system 100 according to Modified Example 3 modified from Example, as illustrated in FIG. 7, the hydrodesulfurizer 2 is sandwiched between the upper and lower halves of the heater 3. With this configuration, substantially the entirety of the hydrodesulfurizer 2 is covered with the heater 3, and the contact area between the hydrodesulfurizer 2 and the heater 3 is increased. This results in an increase in heat-transfer area for the transferring of the heat from the heater 3 to the hydrodesulfurizer 2. Thus, the fuel cell system 100 according to Modified Example 3 modified from Example enables a decrease in temperature unevenness in the hydrodesulfurizer 2.

In the fuel cell system 100 of FIG. 7 according to Modified Example 3 modified from Example, the configuration is such that the cooling gas supplied from the gas supply unit 4 is mixed together with the exhaust gas in the course of the introduction passage 6. Similarly to Modified Example 1, the system may be configured such that the exhaust gas and the cooling gas are introduced into the heater 3 separately and are mixed with each other inside the heater 3.

Modified Example 4

Figure 8:
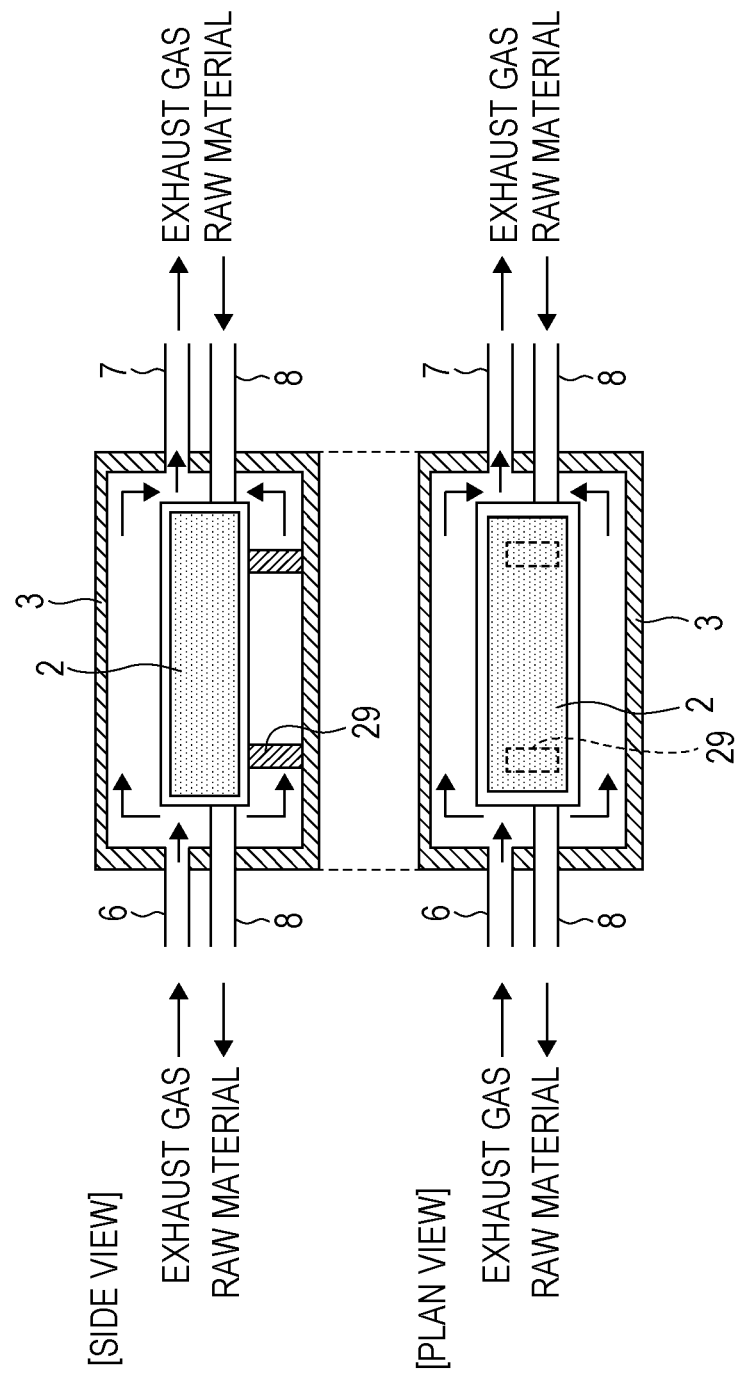
FIG. 8 is a view illustrating an exemplary arrangement of a hydrodesulfurizer and a heater in a fuel cell system according to Modified Example 4 modified from Example.
Figure 9:
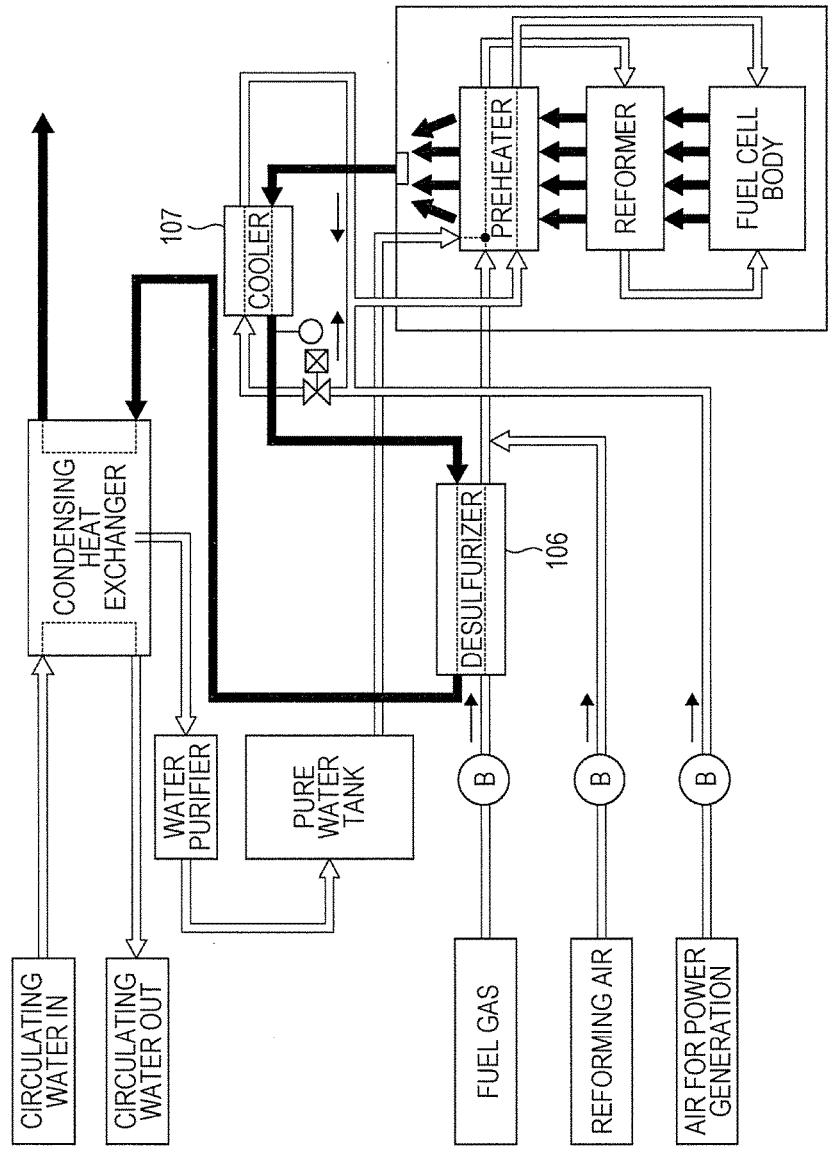
FIG. 9 is a schematic view illustrating an exemplary configuration of a conventional solid oxide fuel cell system.

Further, the hydrodesulfurizer 2 and the heater 3 may be arranged as illustrated in FIG. 8. That is, the configuration of the fuel cell system 100 according to Modified Example 4 is the same as the fuel cell system 100 illustrated in FIG. 4 except that the hydrodesulfurizer 2 and the heater 3 are arranged as illustrated in FIG. 8.

FIG. 8 is a view illustrating an exemplary arrangement of the hydrodesulfurizer 2 and the heater 3 in the fuel cell system 100 according to Modified Example 4 modified from Example. In FIG. 8, the upper view is a side view and the lower view is a plan view of the hydrodesulfurizer 2 and the heater 3.

As illustrated in FIG. 8, the hydrodesulfurizer 2 is accommodated in the housing of the heater 3. That is, the raw material passage 8 penetrates through the heater 3 and is connected to the hydrodesulfurizer 2. Further, the introduction passage 6 and the exhaust gas discharging passage 7 are each connected to communicate with the inside of the housing of the heater 3. The hydrodesulfurizer 2 is accommodated in the housing without any contact with the wall surfaces of the housing of the heater 3. Consequently, a distribution route is formed between the hydrodesulfurizer 2 and the housing of the heater 3 to allow the exhaust gas to flow therethrough. For example, as illustrated in FIG. 8, the hydrodesulfurizer 2 may be supported by two columns 29 made of ceramic in the housing of the heater 3, and the distribution route may be defined around the supported hydrodesulfurizer 2. The number of the columns 29 is not limited to two, and a single column 29, or three or more columns 29 may be provided as long as the hydrodesulfurizer 2 is stably supported. The shape of the columns 29 may be rectangular as illustrated in FIG. 8, or may be circular cylinder.

The materials of the columns 29 are not limited to ceramics, and, for example, may be metals such as stainless steel (SUS) or may be other materials such as resins that can withstand temperatures around 300° C.

The members that support the hydrodesulfurizer 2 are not limited to the columns 29, and may be other supports such as wires or nets. That is, any types of supports may be used which can support the hydrodesulfurizer 2 in the housing of the heater 3.

As illustrated in FIG. 8, the raw material flows through the raw material passage 8 into the hydrodesulfurizer 2, and flows out of the hydrodesulfurizer 2 through the raw material passage 8 disposed on the side opposite to the inflow side. Meanwhile, the exhaust gas mixed with the cooling gas is introduced into the housing of the heater 3 through the introduction passage 6, and flows in the distribution route formed around the hydrodesulfurizer 2 accommodated in the housing. The exhaust gas is then discharged to the outside through the exhaust gas discharging passage 7.

The configuration may be such that a plurality of baffle boards (not shown) are disposed in the housing of the heater 3, and the exhaust gas mixed with the cooling gas is caused to flow in a zigzag manner in the housing by the baffle boards and is thereafter discharged from the heater 3 to the exhaust gas discharging passage 7. The configuration involving such baffle boards is more advantageous in that the exhaust gas may be circulated in the housing of the heater 3 so as to heat the entirety of the hydrodesulfurizer 2 by its heat.

With the above configuration, the fuel cell system 100 according to Modified Example 4 modified from Example may heat the entirety of the hydrodesulfurizer 2 uniformly by the heat of the exhaust gas circulated in the housing of the heater 3. The exhaust gas circulated in the housing of the heater 3 has been temperature-controlled by the mixing with the cooling gas supplied to the introduction passage 6 through the cooling gas passage 10. Consequently, the heater 3 may heat the hydrodesulfurizer 2 to a desired temperature range by utilizing the heat of the exhaust gas circulated in the housing. Thus, the fuel cell system 100 according to Modified Example 4 modified from Example may heat the entirety of the hydrodesulfurizer 2 uniformly to an appropriate temperature.

While the fuel cell systems 100 according to Example and Modified Examples 1 to 3 are configured such that the hydrodesulfurizer 2 is heated by the heat of the exhaust gas transferred from the heater 3 to the hydrodesulfurizer 2 through the surfaces in contact together, the fuel cell system 100 according to Modified Example 4 is configured such that the hydrodesulfurizer 2 is heated by the heat of the exhaust gas circulated around the hydrodesulfurizer 2. Thus, the fuel cell system 100 according to Modified Example 4 is free from the dependency of thermal conductivity on the accuracy of the installation of the hydrodesulfurizer 2 and the heater 3 at their contact surfaces, and consequently the temperature of the hydrodesulfurizer 2 may be controlled with higher accuracy.

While the hydrodesulfurizer 2 accommodated in the heater 3 is illustrated as being rectangular in shape in FIG. 8, the shape of the hydrodesulfurizer 2 is not limited thereto and may be, for example, circular cylinder. The hydrodesulfurizer 2 may be formed with various shapes such as circular cylinder, and the degree of freedom in manufacturing the hydrodesulfurizers 2 is increased.

Further, while FIG. 8 illustrates a single hydrodesulfurizer 2 accommodated in the heater 3, the configuration may be such that a plurality of hydrodesulfurizers 2 are connected together. The hydrodesulfurizers 2 may be connected in series from the side adjacent to the inlet port toward the side adjacent to the outlet port for the exhaust gas in the heater 3, or may be connected in parallel with one another.

In the fuel cell system 100 of FIG. 8 according to Modified Example 4 modified from Example, the configuration is such that the cooling gas supplied from the gas supply unit 4 is mixed together with the exhaust gas in the course of the introduction passage 6. Similarly to Modified Example 1, the system may be configured such that the exhaust gas and the cooling gas are introduced into the heater 3 separately and are mixed with each other inside the heater 3.

Although FIGS. 5 to 8 illustrate the fuel cell systems 100 as having the detector 11 on the hydrodesulfurizer 2 or omit the illustration of the detector 11, as described above, the fuel cell systems 100 according to Modified Examples 1 to 4 may have the detector 11 on the hydrodesulfurizer 2 or the heater 3. Based on the temperature of the heater 3 or the hydrodesulfurizer 2 detected by the detector 11, or based on the temperature of the exhaust gas circulated in the heater 3, the control circuitry 20 performs feedback control to correct the flow rate or the temperature of the cooling gas to be supplied by the gas supply unit 4. With such a configuration, the fuel cell systems 100 according to Modified Examples 1 to 4 may control the temperature of the hydrodesulfurizer 2 with still higher accuracy.

From the foregoing, various modifications and other embodiments of the present disclosure will become apparent to those skilled in the art. Therefore, it should be understood that the aforementioned description is only illustrative and only serves to teach the skilled person an embodiment for carrying out the present disclosure. The details of the structures and/or the functions in the present disclosure may be substantially altered without departing from the spirit of the present disclosure.

The present disclosure may be used in fuel cell systems configured to heat a desulfurizer by utilizing the heat of an exhaust gas circulated in the fuel cell system.

What is claimed is:

1. A fuel cell system comprising:
a hydrodesulfurizer that removes a sulfur compound in a raw material;
a fuel cell that generates power by electrochemical reaction using a fuel gas and an oxidizing gas, the fuel gas being obtained by reforming the raw material desulfurized with the hydrodesulfurizer;
a heater that heats the hydrodesulfurizer by utilizing the heat of an exhaust gas circulated in the fuel cell system including the fuel cell;
an introduction passage disposed to guide the exhaust gas to the heater;
a gas supply unit that supplies a cooling gas to the exhaust gas, the cooling gas being a gas not utilized in the power generation in the fuel cell system, the fuel cell system being configured such that a mixture gas of the exhaust gas and the cooling gas supplied from the gas supply unit is passed through the inside of the heater; and
a heat exchanger configured to heat the oxidizing gas to be supplied to the fuel cell by utilizing the heat of the exhaust gas,
wherein the introduction passage is disposed to guide the exhaust gas heat-exchanged in the heat exchanger to the heater,
the gas supply unit is configured to supply the cooling gas to a portion of the introduction passage located downstream from the heat exchanger and upstream from the heater, and
the exhaust gas includes a combustion exhaust gas produced by the combustion of excess fuel gas and excess oxidizing gas unused in the power generation in the fuel cell.

2. The fuel cell system according to claim 1, wherein
the fuel cell system further comprises control circuitry and a detector that detects the temperature of the hydrodesulfurizer; and
the control circuitry controls the gas supply unit to increase the amount of supply of the cooling gas when the temperature detected with the detector has reached or exceeded an upper limit temperature.

3. The fuel cell system according to claim 1, wherein the exhaust gas includes an excess oxidizing gas unused in the power generation in the fuel cell.

4. The fuel cell system according to claim 1, wherein
the hydrodesulfurizer and the heater are in contact with each other via one or more surfaces; and
the fuel cell system further comprises a heat insulator partially or entirely covering the hydrodesulfurizer and the heater.

5. The fuel cell system according to claim 1, wherein
the heater includes a housing accommodating the hydrodesulfurizer placed therein, and a flow passage disposed to circulate the exhaust gas in the housing; and
the flow passage is disposed on an outer periphery of the hydrodesulfurizer.

6. A fuel cell system comprising:
a hydrodesulfurizer that removes a sulfur compound in a raw material;
a fuel cell that generates power by electrochemical reaction using a fuel gas and an oxidizing gas, the fuel gas being obtained by reforming the raw material desulfurized with the hydrodesulfurizer;
a heater that heats the hydrodesulfurizer by utilizing the heat of an exhaust gas circulated in the fuel cell system including the fuel cell;
an introduction passage disposed to guide the exhaust gas to the heater;
a heat exchanger that heats the oxidizing gas to be supplied to the fuel cell by utilizing the heat of the exhaust gas, the heat exchanger disposed on the introduction passage;
a gas supply unit that supplies a cooling gas to the exhaust gas, the gas supply unit supplies the cooling gas to a portion of the introduction passage located downstream from the heat exchanger and upstream from the heater, and an exhaust gas discharging passage that discharges the exhaust gas and the cooling gas from the heater, wherein the exhaust gas includes a combustion exhaust gas produced by the combustion of excess fuel gas and excess oxidizing gas unused in the power generation in the fuel cell.

* * * * *